July 13, 1954  J. H. RAMSEY  2,683,285
PROCESS OF AND APPARATUS FOR VULCANIZATION
Filed May 22, 1952  2 Sheets-Sheet 1
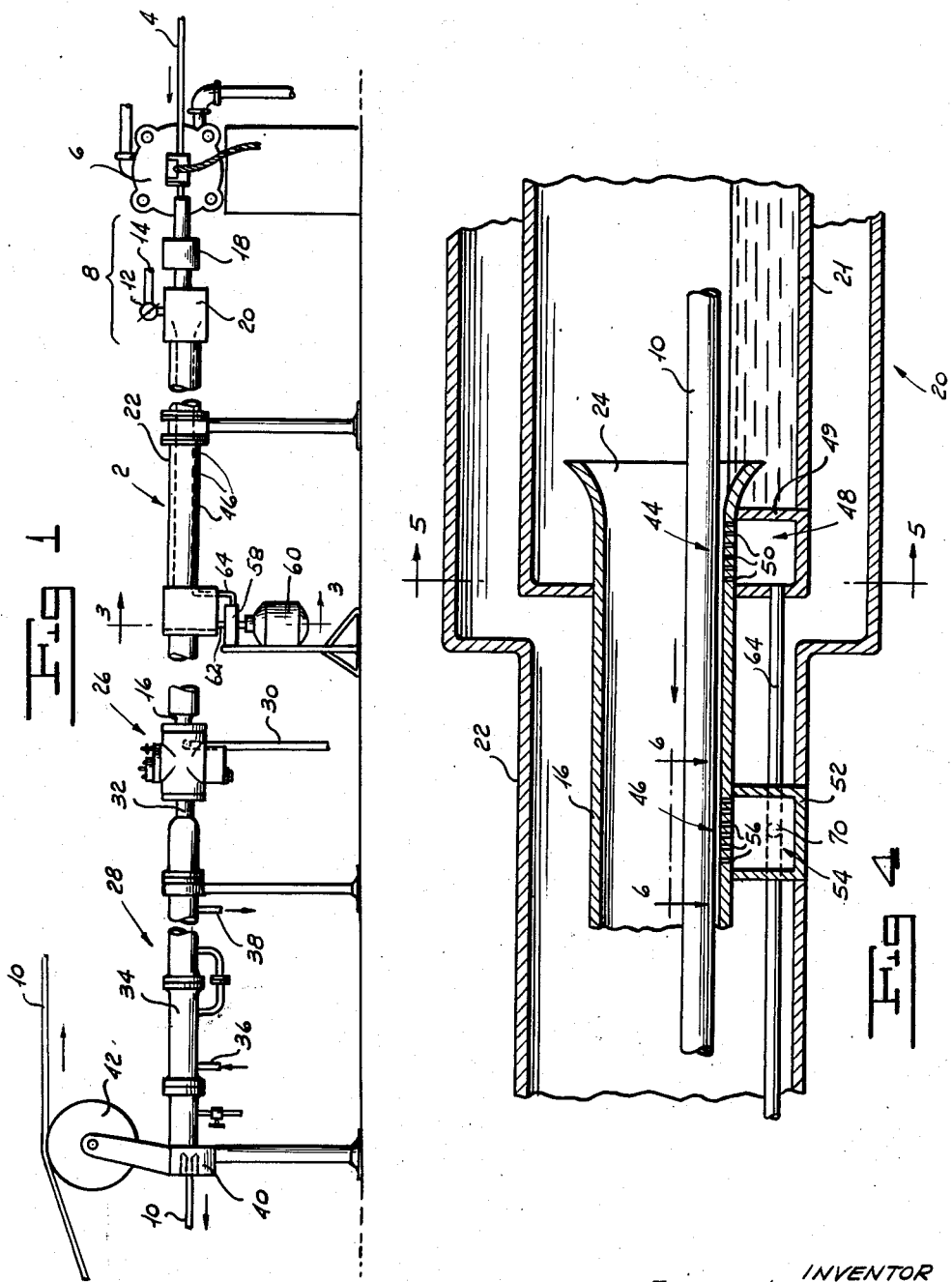
INVENTOR
JUSTIN H. RAMSEY
Alfred W. Vibber
ATTORNEY July 13, 1954  J. H. RAMSEY  2,683,285
PROCESS OF AND APPARATUS FOR VULCANIZATION
Filed May 22, 1952  2 Sheets-Sheet 2
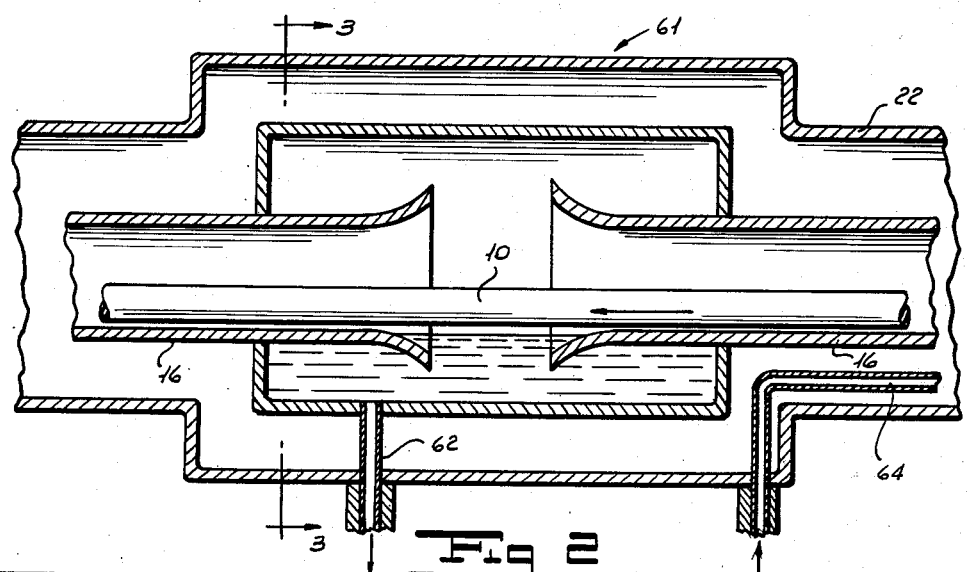
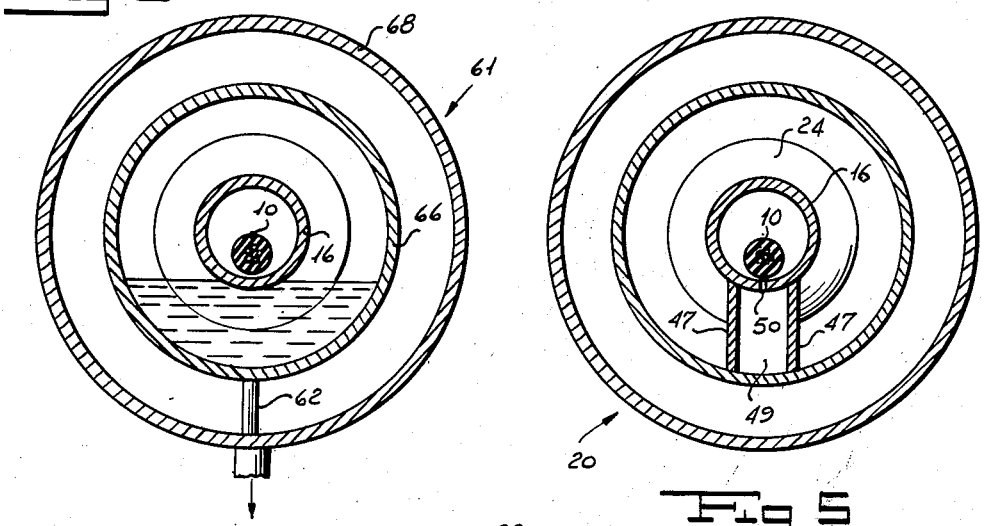
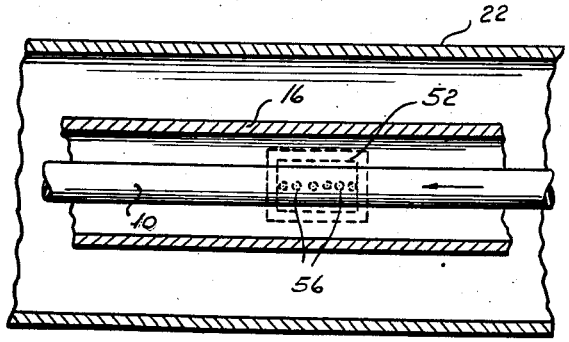
INVENTOR
JUSTIN H. RAMSEY
Alfred W. Nibber
ATTORNEY

Patented July 13, 1954

2,683,285

UNITED STATES PATENT OFFICE 2,683,285

PROCESS OF AND APPARATUS FOR VULCANIZATION

Justin H. Ramsey, Ramsey, N. J.

Application May 22, 1952, Serial No. 289,321

9 Claims. (Cl. 18—6)

This invention relates to a process of and an apparatus for continuously vulcanizing elongated vulcanizable articles while they are traveling in the direction of their length.

In the preferred process and in the use of the preferred embodiment of the apparatus illustrated herein the elongated vulcanizable article is an electrical cable which is sheathed with an electrically insulating coating or cover, such cover being applied by an extrusion machine. The vulcanizing apparatus shown immediately follows the extruder in the production line, the thus sheathed conductor issuing from the extrusion head directly into the vulcanizing zone of the vulcanizing apparatus. In its freshly extruded condition, the elastomeric material such as natural or snythetic rubber forming the sheath of the cable is very soft and thus easily injured should it come into contact with any rough or edged object. The extruded sheath, prior to appreciable vulcanization thereof, is in fact so soft and prone to injury that it is frequently objectionably scuffed even by coming into contact with the relatively smooth bottom inner surface of the chamber at the vulcanizing zone.

Because, in typical installations of continuous vulcanizing apparatus, the combined lengths of the vulcanizing and of the cooling zone frequently exceeds 200 feet, and because of the appreciable weight of the sheathed conductor, it is impossible to prevent the contact between the conductor and the inner bottom surface of the chamber at the vulcanizing zone by subjecting the conductor to tension to suspend it free of any intermediate support. The provision of rollers and the like for supporting the sheathed conductor in the first part of the vulcanizing zone is impractical because such zone is subjected to high pressure and temperature, the atmosphere being steam, so that after a short time such rollers, although initially fitted with antifriction bearings, tend to seize on their bearings and thus to scuff and mar the cable fully as much as does the plain bottom of the vulcanizing chamber.

It is among the objects of the present invention to provide a novel improved vulcanizing process and apparatus whereby direct contact between the elongated vulcanizable article and the container inner surface is avoided.

The invention has as a further object thereof, in the preferred embodiment shown and described, the attainment of the above result by the provision of a film of lubricating material interposed between the article and the container bottom.

Yet another object of the invention, in specific embodiments thereof, resides in the provision of apparatus of the type indicated wherein the vulcanizing medium in the vulcanizing zone is steam and the lubricating film between the elongated article and the chamber or container wall is water. Such object is obtained, in the presently preferred embodiment of the invention, by directing water under pressure against the bottom of the elongated vulcanizable article as it travels through the elongated vulcanizing chamber, whereby to form the interposed lubricating film and further to tend to lift or buoy up the article, the water preferably being that which condenses from the steam in the vulcanizing chamber.

The above and further objects of the invention will be more readily apparent upon consideration of the following description of a preferred embodiment of the method and apparatus of the invention.

In the accompanying drawings, forming a portion of the specification:

Fig. 1 is an over-all view in side elevation of a continuous vulcanizing apparatus incorporating the device of the invention;

Fig. 2 is a view in vertical axial cross-section through the apparatus shown in Fig. 1, the section being taken at the zone of the lubricating water supplying sump;

Fig. 3 is a view in vertical transverse cross-section through the apparatus shown in Fig. 2, the section being taken along the lines 3—3 in Figs. 1 and 2;

Fig. 4 is a view in vertical axial cross-section through the apparatus at the entering end of the vulcanizing chamber;

Fig. 5 is a view in vertical transverse cross-section through the apparatus shown in Fig. 4, the section being taken along the line 5—5, in Fig. 4; and Fig. 6 is a view in horizontal axial cross-section through the apparatus shown in Fig. 4, the section being taken along the line 6—6 in Fig. 4.

The vulcanizing apparatus with which the present invention is illustrated is in general similar to that illustrated in my Patent No. 2,603,834. A brief description of such apparatus as a whole is given herein, in order that the manner in which the device of the present invention cooperates therewith may be readily understood.

The vulcanizing chamber 2 consists of a pipe 16 disposed horizontally, such pipe providing within it a cavity through which the sheathed product travels. The chamber 2 has a steam jacket 22 disposed about it throughout its length, in order to maintain the chamber 2 substantially uniformly at the high temperature required for vulcanization. Chamber 2, in a typical installation, will have a length on the order of 175 feet. To the forward end of the chamber 2 there is connected the apparatus by means of which the conductor is sheathed and fed into the vulcanizing chamber. As shown, conductor 4 is introduced in a direction from right to left in Fig. 1 through the die box of the extruding apparatus 6 from which it emerges as a sheathed conductor 10. The conductor then travels through the connecting means between the extruding head and the vulcanizing chamber. The connecting means 8 includes the splice box 18 and the vulcanizing chamber entrance member 20 which is more clearly shown in Fig. 4. To the means 20 there is connected the valve means 12 through which, by means of inlet pipe 14, the vulcanizing steam is introduced to the vulcanizing chamber. In a typical installation such steam will be at a pressure of from 200 to 250 pounds per square inch.

The sheathed conductor 10 travels through the vulcanizing chamber 2, and then through the unit 26, which may be identical with the partial barrier providing unit which is the subject of Patent No. 2,603,834 and which is designated 18 in such patent. Unit 26 has for its function the maintenance of a stable boundary between the water in the cooling zone 28 and the steam in the vulcanizing chamber 2. Unit 26 is provided with the drain pipe 30 by which the vulcanizing process condensate is discharged through a trap.

The vulcanized and partially cooled sheathed conductor travels through the cooling zone 28, which has an inner cooling chamber providing pipe 32 and an outer jacket 34 thereon. The cooling jacket between the inner and outer pipes is supplied with cooling water through the inlet pipe 36, such water being exhausted therefrom through pipe 38. The sheathed conductor 10 leaves the left-hand end of the cooling chamber through the exit seal shown generally at 40, from which the vulcanized, cooled, conductor emerges into the atmosphere. The conductor is then fed rearwardly to a conductor traversing and take-up means, not shown, over sheave 42.

As shown in Fig. 4, the sheathed conductor 10 enters the right-hand end of pipe 16 providing the vulcanizing portion of the elongated chamber through the bell mouthed opening 24, the distance between the extrusion head and the bell mouth being such that the conductor travels free from contact with any fixed guides in a slight catenary between the extrusion head and the right-hand end of pipe 16. The first direct contact between the sheathed conductor 10 and the pipe 16, therefore, would normally take place at a zone somewhat inwardly of the outer edge of the bell mouth 24. In the prior practice, contact between the conductor 10 and the bottom inner surface of pipe 16 was practically continuous, with a rubber-to-metal contact, throughout the length of travel of the conductor in such pipe. It is such rubber-to-metal contact, particularly at and near the entering end of the pipe 16, which the present invention is designed substantially to eliminate.

The vulcanization of the sheath is, of course, progressive, the sheath becoming harder and more resistant to scuffing and abrasion as it travels further to the left. It is most important, therefore, that such sheath be protected, if possible, from abrasion as by contact with the bottom of the tube 16 in the first portion of the travel of the conductor through the entering end of such tube. As above indicated, the present invention accomplishes such result by interposing a film of lubricating material which is not incompatible with the vulcanizing atmosphere, between the thus moving conductor and the bottom inner supporting surface of the vulcanizing chamber. In the preferred embodiment illustrated, the lubricating material is so introduced as to provide a substantial lifting effect on the conductor, thereby still further tending to relieve it from direct contact with the inner surface of the chamber. Specifically, where, as usual, the vulcanizing atmosphere is steam, the lubricating film is formed of water. In such case, it is most economical and satisfactory to employ as such water the condensate from the steam in the vulcanizing chamber, since such water is available in the vicinity where it is to be used, and since it is heated to the same or very close to the same temperature as that of the vulcanizing chamber. Furthermore, it is most economical to employ such condensate, since it is already at the pressure of the vulcanizing zone and the pump means employed to introduce the lubricating film forming water into the chamber thus needs to operate at but a small pressure differential. It also means that no problem of water level maintenance in the chamber is imposed, as would be the case with water injected from an outside source.

In the preferred embodiment of the apparatus of the invention shown, there is provided at the zone just inwardly of the bell mouth 24 in pipe 16 a first film forming jet means 44. As indicated in Fig. 1, to the left of means 44 there is a series of spaced jet providing means 46, so as to provide substantially a continuous film of water between the conductor and the inner chamber wall throughout the entire vulcanizing apparatus. A spacing on the order of five feet between adjacent means 46 and between means 44 and the adjacent means 46 has been found satisfactory. It is to be understood, however, that such series of means 46 need not extend throughout the length of the vulcanizing chamber, but may be provided only at the entering end of the chamber, where the most damage to the vulcanizable material from scuffing and abrasion of it occurs in conventional continuous vulcanizing apparatus. The jet means 44 is formed, as shown, by the provision of a plurality of holes 50 through the bottom wall of the pipe 16, such holes 50 being located in a vertical plane axial of pipe 16. Centrally beneath such openings 50 there is provided a small supply well or tank 48 which is formed from a portion of the sump forming enlargement 21 to pipe 16 within member 20 by use of partition members 47 and 49 welded thereto. Such well 48 is in immediate thermal communication with the sump in enlargement 21 and also with the steam jacket between the elements 16 and 22 and that surrounding enlargement 21. Thus the condensate in well 48 remains at a temperature very nearly the same as the temperature of the vulcanizing medium in the chamber. The other jet forming members 46, which are likewise formed in the bottom of pipe 16 with a series of vertical holes 56 axial of pipe 16 are made up by the use of plate members such as 52 which are inserted through holes in the steam jacket 22 and are welded thereto and to the outer surface of the pipe 16. As shown, a substantial portion of the outer walls of such wells 54 is in immediate thermal communication with the steam jacket, so that the contents of such wells remain at substantially the temperature of the vulcanizing zone.

The jet forming means 44 and 46 are supplied by means of the pump 58 which is driven by the motor 60, the pump being supplied from the sump 61 through the pipe 62. The condensate in inner member 66 of sump 61 is at the pressure of the steam in the vulcanizing chamber. The pump delivers liquid under pressure, which may be only slightly in excess of the pressure within the supply pipe 62, to the pipe 64 from which it is delivered to the jet forming means 44 and 46. For the purpose of insuring that the water introduced through the jets into the vulcanizing chamber shall be at substantially the temperature of such chamber, the pipes 62 and 64 are preferably insulated, as indicated in Fig. 2, and the delivery pipe 64 is disposed for as great a part of its length as possible within the steam jacket between the inner and outer members 66 and 68, at sump 61, and in the steam jacket between the chamber forming pipe 16 and the outer pipe 22. Connection is made between pipe 64 and each of the wells 54 by a branch fitting connected to the side of the well, as at 70 in Fig. 4. Pipe 64 may be run directly into the rear wall of well 48, also as shown in Fig. 4.

As is apparent in Figs. 4 and 5, the sheathed conductor 10 lies immediately above each of the jet providing means 44 and 46. The water introduced under pressure through such openings 50 and 56, acting directly upon the moving conductor 10, buoys it up slightly, as shown in Fig. 4, both by reason of the direct, lifting, jet action upon it and also because of the formation of a film of water between it and the inner bottom surface of the pipe 16. The continuity of such film is substantially maintained between successive jet forming means, the film, of course, being replenished and re-formed at each such means. Because in the preferred embodiment the water which is introduced into the vulcanizing chamber through the openings 50 and 56 is at or substantially at the temperature existing within the vulcanizing chamber, such water does not introduce any non-uniformity into the curing or vulcanizing of the sheath. Furthermore, because the pipe 16 is positioned horizontally, because the sump 61 is in immediate communication with the pipe 16, and because the left-hand end of pipe 16 is drained through the unit 26 and the pipe 30, the condensate thus recirculated by pump 58 can have no general effect on the water level in the system. The introduction of the vulcanizing steam under pressure at the entering end of the chamber, and the constant travel of conductor 10 to the left, of course, tend to impel water in the vulcanizing chamber to the left and into sump 61 and unit 26.

It has been found that sheathed conductors treated in the vulcanizing apparatus of the invention are characterized by their substantial uniformity of curing and also by the lack of any substantial marring or scuffing of the sheath. In this they distinguish from sheathed conductors treated in prior vulcanizing apparatus wherein the conductor had rubber-to-metal contact for a substantial portion of its length of travel in the vulcanizing chamber between the sheath and such chamber.

Whereas for purposes of illustration I have shown and described a preferred method of and apparatus for vulcanizing elongated vulcanizable materials such as sheathed conductors, it is to be understood that such embodiments are illustrative only and that the invention, in both its method and apparatus aspects, is capable of considerable variation as to details. The invention is, therefore, to be defined by the scope of the claims appended hereto.

I claim as new the following:

1. The process for the continuous vulcanization of elongated vulcanizable material which comprises passing such material continuously through a vulcanizing zone in an elongated chamber, subjecting the material to contact with steam under pressure while passing through the vulcanizing zone to vulcanize the material, withdrawing condensate from the vulcanizing zone, such condensate being at substantially the same temperature as the vulcanizing zone, and reintroducing such heated condensate under pressure into the vulcanizing zone beneath the material and between it and the inner surface of the chamber.

2. The process for the continuous vulcanization of elongated vulcanizable material which comprises passing such material continuously through a vulcanizing zone in an elongated chamber, subjecting the material to contact with steam under pressure while passing through the vulcanizing zone to vulcanize the material, maintaining a portion of the condensate from the vulcanizing steam in direct pressure transmitting relationship therewith and at substantially the same temperature as the vulcanizing zone, withdrawing such condensate from the vulcanizing apparatus and reintroducing the heated condensate under pressure in an upward direction beneath the material and between it and the inner surface of the chamber so as at least partially to lift the material.

3. The process for the continuous vulcanization of elongated vulcanizable material which comprises passing such material continuously through a vulcanizing zone in an elongated chamber, subjecting the material to contact with steam under pressure and passing through the vulcanizing zone to vulcanize the material, maintaining a portion of the condensate from the vulcanizing steam in direct pressure transmitting relationship therewith and at substantially the same temperature as the vulcanizing zone, withdrawing such condensate from the vulcanizing apparatus and reintroducing the heated condensate under pressure at a zone at the entering end of the vulcanizing zone beneath the material and between it and the inner surface of the chamber to provide a film of lubricating water between the material and the inner surface of the chamber.

4. The process for the continuous vulcanization of elongated vulcanizable material which comprises passing such material continuously through a vulcanizing zone in an elongated chamber, subjecting the material to contact with steam under pressure while passing through the vulcanizing zone to vulcanize the material, maintaining a portion of the condensate from the vulcanizing steam in direct pressure transmitting relationship therewith and at substantially the same temperature as the vulcanizing zone, withdrawing such condensate from the vulcanizing apparatus and reintroducing the heated condensate under pressure at zones spaced longitudinally of the vulcanizing zone in an upward direction beneath the material and between it and the inner surface of the chamber to provide a film of lubricating water between the material and the inner surface of the chamber throughout substantially the entire length of the vulcanizing zone.

5. Apparatus for the continuous vulcanization of elongated vulcanizable material comprising an elongated chamber through which the material travels in the direction of its length, means for introducing into the chamber and maintaining therein steam under pressure to form a vulcanizing zone, a condensate containing sump in direct pressure transmitting relationship with the vulcanizing zone of the chamber, and means for introducing under pressure condensate from such sump into the vulcanizing zone in at least the initial portion thereof in an upward direction beneath the material and between it and the upper inner surface of the chamber.

6. Apparatus for the continuous vulcanization of elongated vulcanizable material comprising an elongated chamber through which the material travels in the direction of its length, means for introducing into the chamber and maintaining therein steam under pressure to form a vulcanizing zone, a condensate containing sump in direct pressure transmitting relationship with the vulcanizing zone of the chamber, means to maintain such sump and its contents at substantially the same temperature as the vulcanizing zone, and means for introducing under pressure condensate from such sump into the vulcanizing zone in at least the initial portion thereof in an upward direction beneath the material and between it and the upper inner surface of the chamber.

7. Apparatus for the continuous vulcanization of elongated vulcanizable material comprising an elongated chamber through which the material travels in the direction of its length, means for introducing into the chamber and maintaining therein steam under pressure to form a vulcanizing zone, a condensate containing sump in direct pressure transmitting relationship with the vulcanizing zone, means for maintaining the sump at substantially the same temperature as the vulcanizing zone, and at least one jet forming means positioned on the bottom surface of the vulcanizing chamber at the entering end of the chamber, such jet forming means being so positioned that the vulcanizable material travels directly over the inner end thereof, a pump, means to drive said pump, means to supply the pump with condensate from the sump, and means connecting the output of such pump to the jet forming means, whereby condensate under pressure is introduced beneath the material and between it and the inner surface of the chamber.

8. Apparatus for the continuous vulcanization of elongated vulcanizable material comprising an elongated chamber through which the material travels in the direction of its length, means for introducing into the chamber and maintaining therein steam under pressure to form a vulcanizing zone, a condensate containing sump in direct pressure transmitting relationship with the vulcanizing zone, means for maintaining the sump at substantially the same temperature as the vulcanizing zone, and a series of jet forming means positioned in spaced relationship along the bottom surface of the vulcanizing chamber, such jet forming means being so positioned that the vulcanizable material travels directly over the inner ends thereof, a pump, means to drive said pump, means to supply the pump with condensate from the sump, and means connecting the output of such pump to the jet forming means, whereby condensate under pressure is introduced beneath the material and between it and the inner surface of the chamber to provide a lubricating water film which substantially prevents direct contact between the material and the chamber wall.

9. Apparatus for the continuous vulcanization of elongated vulcanizable material comprising an elongated chamber through which the material travels in the direction of its length, means for introducing into the chamber and maintaining therein steam under pressure to form a vulcanizing zone, a steam heating jacket disposed about the elongated vulcanizing chamber, a condensate containing sump in direct pressure transmitting relationship with the vulcanizing zone and located at the forward, conductor entering, end of the vulcanizing chamber, the steam heating jacket having immediate thermal contact with at least a portion of such sump whereby it is maintained at substantially the same temperature as the vulcanizing zone, and a series of jet forming means positioned in spaced relationship along the bottom surface of the vulcanizing chamber, such jet forming means being so positioned that the vulcanizable material travels directly over the inner ends thereof, a jet means supplying well in immediate communication with each such jet means, each such well extending through and being at least partially surrounded by said steam jacket, a pump, means to drive said pump, means to supply the pump with condensate from the sump, and means connecting the output of such pump to the jet forming means, whereby condensate under pressure is introduced beneath the material and between it and the inner surface of the chamber at least partially to lift the material and to provide a lubricating water film which substantially prevents direct contact between the material and the chamber wall.

References Cited in the file of this patent

UNITED STATES PATENTS

| Number | Name | Date |
|---|---|---|
| 2,069,087 | Forstrom et al. | Jan. 26, 1937 |
| 2,291,344 | Powell | July 28, 1942 |
| 2,387,886 | Devol | Oct. 30, 1945 |
| 2,553,938 | Peirce | May 22, 1951 |
| 2,561,820 | Ramsey et al. | July 24, 1951 |
| 2,655,690 | Henning | Oct. 20, 1953 |

FOREIGN PATENTS

| Number | Country | Date |
|---|---|---|
| 475,618 | Canada | July 31, 1951 |